Figure 1:
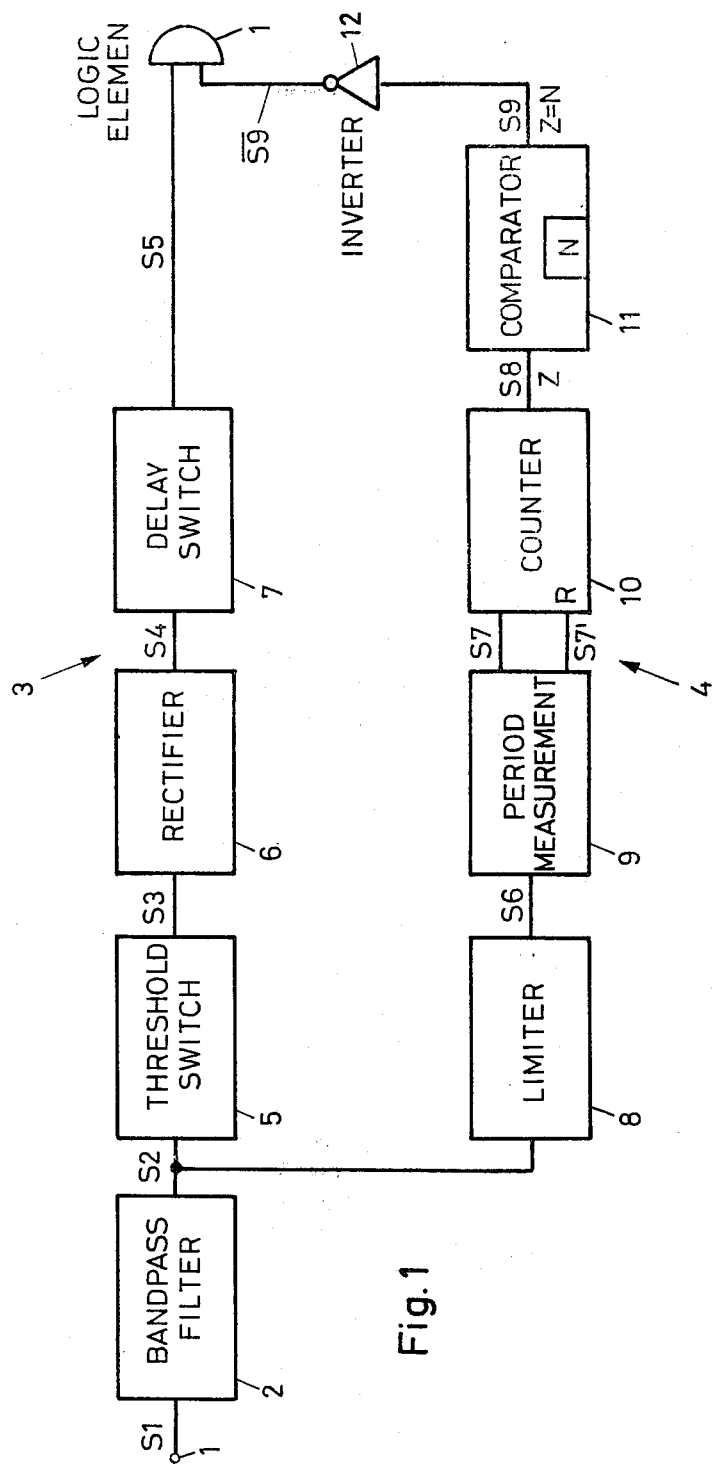

United States Patent [19]

Daneffel

[11] 4,296,277

[45] Oct. 20, 1981

[54] ELECTRONIC VOICE DETECTOR

[75] Inventor: Hansruedi Daneffel, Uerikon, Switzerland

[73] Assignee: Feller AG, Horgen, Switzerland

[21] Appl. No.: 79,186

[22] Filed: Sep. 26, 1979

[30] Foreign Application Priority Data

Sep. 26, 1978 [CH] Switzerland ............... 10033/78

[51] Int. Cl.$^3$ .......................................... H04M 1/64
[52] U.S. Cl. ................................. 179/1 VC; 179/6.14
[58] Field of Search ............ 179/1 VC, 1 VL, 1 HF, 179/6 R, 100.1 VC, 6.14, 81 B; 340/148

[56] References Cited

U.S. PATENT DOCUMENTS 3,873,772  3/1975  Dumler .................... 179/1 VC

*Primary Examiner*—Joseph A. Popek
*Attorney, Agent, or Firm*—Weiser, Stapler & Spivak

[57] ABSTRACT

A voice detector for supplying a control signal in an automatic telephone answering apparatus in response to a voice signal received from a telephone line. A first one of two parallel signal channels generates a first digital signal for an incoming signal having a minimum amplitude with a minimum duration. The second signal channel generates a second digital signal for an incoming signal having a minimum number of consecutive cycles with periods within a predetermined range corresponding to the frequency range of a ringing signal. A logic element combines the first and second digital signals to produce the control signal if simultaneously the first digital signal is present and the second digital signal is absent. Thereby, the control signal is produced only in response to an incoming voice signal, but not in response to a ringing or a noise signal.

10 Claims, 2 Drawing Figures

ELECTRONIC VOICE DETECTOR

The invention relates to a voice detector for use in an automatic telephone answering apparatus in which the voice detector supplies a control signal in response to a voice signal from a telephone line. More particularly, it relates to a voice detector having input means for receiving audio signals from the telephone line, and output means for supplying the control signal indicating the presence of an incoming voice signal.

Voice detectors of that type, which sometimes are also designated as speech switches, are known, for example, from the Canadian Patent Specification No. 961,186 and from the corresponding British Patent Specification No. 1,388,037 as well as from the U.S. Pat. No. 3,937,893 by Willy Muller et al. Such voice detectors have the task of detecting a voice signal arriving over the telephone line, discriminating the voice signal against any other signal in the audio frequency range such as a ringing signal from the exchange or noise signals which may arrive over the telephone line, and supplying a voice signal responsive control signal which is used in the telephone answering apparatus for performing switching functions disclosed in detail in the aforementioned patent specifications.

Voice detectors of the present type show the inherent problem of reliably recognizing a voice signal in the voice frequency range of approximately 600 Hz to 3600 Hz, but to completely suppress any ringing signal which arrives over the telephone line with a high amplitude and a frequency which is contiguous to the lower end of the voice frequency range, and which normally is between about 400 and 500 Hz. The provision of a filter having steep response slopes is practically useless, because in most cases the ringing signals show a harmonic distortion attaining 30%. Therefore, higher harmonics will be present with high amplitudes over the entire voice frequency range. Other more sophisticated methods of suppressing ringing signals or noise signals in the voice frequency range, such as methods of frequency analyses, result in expensive circuit realizations which, in addition are subject to frequent troubles and failures.

Accordingly, it is the principal object of the present invention to provide a voice detector of the initially described type which makes possible an unambiguous and reliable detection of voice signals with the aid of relatively simple and stable circuit means.

It is a further object of the invention to provide a voice detector including circuit means for determining the presence of a ringing signal and for deriving therefrom a control signal representative of a voice signal in the incoming audio signal.

These and other objects which will appear are achieved in accordance with the invention by providing a voice detector in which between the input means receiving audio signals from the telephone line and the output means supplying the desired control signal, two signal channels are arranged in a parallel configuration. The first signal channel comprises threshold means and delay means connected thereto. The threshold means generate an output signal if the signal from the input means has an amplitude exceeding a predetermined level. The delay means generate an output signal if the output signal from the threshold means has a duration exceeding a predetermined time interval. The second signal channel comprises period measuring means and counting means connected thereto. The period measuring means measure the period of each cycle of the signal from the input means. If the period of a cycle is within a predetermined range corresponding to the frequency range of the ringing signal, a first signal from the period measuring means is supplied to a counting input of the counting means. Whenever the measured period of a cycle falls outside the predetermined range, a second signal from the period measuring means is supplied to a reset input of the counting means. Consecutive counting signals from the period measuring means are counted in the counting means upto a predetermined count, whereupon the counting means generate an output signal. The output signals from the delay means in the first signal channel and from the counting means in the second signal channel are supplied to a logic circuit means which supplies the control signal to the output means of the voice detector provided the output signal from the delay means is present, whilst the output signal from the counting means simultaneously is absent.

Figure 2:
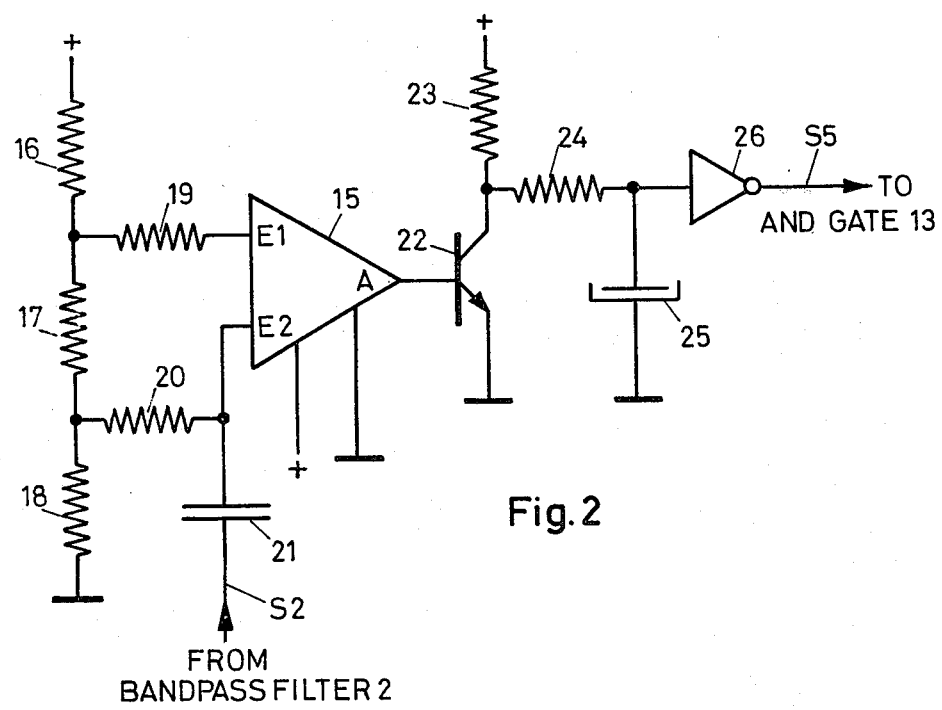

The invention will be further described with reference to illustrative embodiments and the accompanying drawings wherein FIG. 1 is a block diagram of a voice detector according to the invention; and FIG. 2 is an individual circuit diagram of a portion of the voice detector.

Referring to FIG. 1, the voice detector is designed to be connected, in an automatic telephone answering apparatus, between a telephone line terminal of the apparatus and a change-over device of the apparatus which switches the apparatus either to the operational state of recording an incoming telephone message when the voice of the caller is detected, or to the operational state of supplying a final announcement text to the telephone line when the message is terminated and no voice is detected from the caller. Connections of a voice detector in an automatic telephone answering apparatus are illustrated, by way of example, in the patent specifications referred to above.

An input terminal 1 of the voice detector receives a signal S1 indirectly from other circuits of the telephone answering apparatus (not shown) which are in connection with the telephone line, such as a line transformer, relay contacts, an amplifier. The signal S1 may include a ringing signal from the telephone exchange and/or voice signals from the caller as well as noise signals which may be present on the telephone line. The signal S1 is supplied to a bandpass filter 2, the pass band of which extends over the useful frequency range of the incoming signals including the ringing signal, i.e., approximately from 300 Hz to 3600 Hz. The bandpass filter may have a moderate to low Q-factor (circuit-Q) as it serves the only purpose of blocking noise signals outside the useful frequency range.

The output signal S2 of the bandpass filter 2 is simultaneously furnished to a first circuit or signal channel 3 and to a second circuit or signal channel 4. Generally, the signal channel 3 transforms the input signal S2 into a first digital signal provided its amplitude is higher than a predetermined minimum value and its duration is longer than a predetermined value, and the signal channel 4 provides a second digital signal in response to a predetermined period of the input signal S2 and in response to a predetermined number of successive occurences of such periods.

The first signal channel 3 comprises, in successive connections, a threshold switch 5 supplying an output signal S3, a rectifier circuit 6 supplying an output signal S4, and a delay switch 7 supplying an output signal S5. The threshold switch changes its switch state and supplies the output signal S3 when the input signal S2 reaches or exceeds a predetermined amplitude. The delay switch 7 suppresses those rectified output signals S4 from the rectifier circuit 6 which have a shorter duration than a predetermined value of, for example, 3 milliseconds. By that feature, short noise pulses and peaks are effectively suppressed. The delay switch 7 is further designed to stretch an output signal S4 from the rectifier circuit 6, which is of longer duration than said minimum value, to a digital output signal S5 having a predetermined minimum duration of, for example, 0.5 seconds. Thus, the digital output signal S5 from the delay switch 7 occurs provided the signal S1 arriving at the input terminal 1 from the telephone line lies within the pass band of the bandpass filter 2, has a minimum amplitude, and has a minimum duration.

The second signal channel 4 serves the purpose of detecting whether the output signal S2 from the bandpass filter 2 comprises a ringing signal which normally has a frequency from about 400 Hz to 500 Hz. The signal channel 4 includes a symmetrical limiter 8 which brings the signal S2 into a digital form. The output signal S6 from the limiter 8 is supplied to a period measuring circuit 9. The period measuring circuit 9 measures each period of the signal 6 by measuring the time interval between successive positively rising slopes of the signal S6. Each time the period measured is within a range corresponding to the frequency range of the ringing signal, i.e. within a range from 2 milliseconds to 2.5 milliseconds for the above-mentioned frequency range between 400 and 500 Hz of the ringing signal, the measuring circuit 9 furnishes a first digital output signal S7. However, when a period of the signal S6 is outside said range between 2 and 2.5 milliseconds, the measuring circuit 9 furnishes a second digital output signal S7'. The first and second output signals S7 and S7', respectively, appear at different output terminals of the measuring circuit 9.

The counting input of a counter 10 is connected to the output of the measuring circuit 9, furnishing the output signal S7, and thus counts all successive periods of the signal S6 having periods within the predetermined range. A reset input of the counter 10 is connected to the other output of the measuring circuit 9 furnishing the output signal S7'. Therefore, the counter 10 is reset to zero whenever a period of the signal 6 is not within the predetermined range.

The counter 10 has an output terminal at which an output signal S8 representing the momentary count Z of the counter 10 is available, and to which a comparator 11 is connected. The comparator 11 compares the momentary count Z of the counter 10 with a predetermined value N. The comparator 11 delivers a digital output signal S9 when the count Z of the counter 10 equals the predetermined value N. Thereby the output signal S9 appears provided N periods of an audio signal S1 having a frequency between 400 and 500 Hz have arrived successively and without interruption at the input terminal 1. The number N may be 50, for example. However, if the audio signal S1 having a frequency between 400 and 500 Hz has been interrupted for any reason before reaching a time length of N periods, the output signal S9 will not be generated in view of the resetting to zero of counter 10 due to the interruption. Therefore, a voice signal having a frequency portion between 400 and 500 Hz cannot generate an output signal S9, because it is highly improbable that any voice signal will show a narrowly limited frequency component of relatively long duration. In other words, the appearance of output signal S9 positively indicates that the incoming signal S1 at terminal 1 is a ringing signal from the telephone exchange.

In order to provide a useful signal representative of the presence of a voice signal only, the digital output signal S5 from the delay switch 7 and the digital output signal $\overline{S9}$ from an inverter 12, to which the output signal S9 from the comparator 11 is supplied, are linked together by means of a logic element 13 which may be a simple AND gate. Thus, the output terminal 14 of the present voice detector, which is connected to the output of the AND gate 13, provides a digital signal S10. The signal S10 has one of two levels as, for example, a positive level when the signal S5 has a corresponding level, and the signal $\overline{S9}$ has the other binary level. In other words, the signal S10 is supplied to the terminal 14 provided the input signal S1 supplied to the input terminal 1 simultaneously has the following characteristics:

It lies within a frequency range from 300 to 3600 Hz;
It has a minimum level;
It shows a minimum duration; and
It is not a periodical ringing signal with a frequency from 400 to 500 Hz.

Therefore, the output signal S10 indicates that the input signal S1 is a voice signal. The foregoing characteristics, i.e., bandpass frequencies, minimum level, minimum duration and frequency range of the ringing signal, may be adapted to the specific requirements, of course.

As is readily apparent from FIG. 1 and the above description, the circuit features described may be realized in a simple and straight-forward manner in spite of the high discriminating accuracy obtained. In the second signal channel 4, the limiter preferably is a known Schmitt trigger circuit. Circuits 9 for measuring the length of the periods of a periodical signal, in particular of a digital periodical signal, are well known, and may include a digital comparator which compares the digital result of such measurement with a range of predetermined digital values to deliver either signal S7 or S7' to the counter 10. Digital counters 10 are well known, too. The comparator 11 may form a part of the counter 10 in that the counter 10, in a well-known manner, generates an output signal S8 when it has reached its counting capacity N.

As to the circuit elements 5, 6 and 7 of the first signal channel 3, a preferred embodiment will be described below in connection with FIG. 2. As already mentioned, signal S5 in the channel 3 and all signals from and including signal S6 in the channel 4 are digital. Therefore, it may be of advantage to incorporate the measuring circuit 9, the counter 10, the comparator 11, the inverter 12 and the AND gate 13 as an additional function of a microcomputer which forms part of a type of automatic telephone answering apparatus as a central control unit. Such telephone answering apparatus is known from the German Patent Application Ser. No. 2,633,882, published on Feb. 2, 1978.

FIG. 2 represents a diagram of a preferred circuit combining the functions of the threshold switch 5, the rectifier 6 and the delay switch 7 as described above.

To obtain the threshold function, the two input terminals E1 and E2 of an operational amplifier 15 are maintained at fixed potentials by means of a voltage divider including series resistors 16, 17 and 18 disposed between the positive supply voltage and the common supply voltage or earth. The respective reference voltages are supplied to the inputs E1 and E2 through isolating resistors 19 and 20, respectively. The signal S2 from the output of the bandpass filter 2 (FIG. 1) is furnished to the second input E2 of the operational amplifier through a capacitor 21. Therefore, a positive voltage at the output A of the operational amplifier appears only, if the positive amplitude of the signal S2 is higher than the difference of potentials at the inputs E1 and E2.

With its base, a npn-transistor 22 is connected to the output A of the operational amplifier 15, its emitter being connected to earth, and its collector being connected to the positive supply voltage through a load resistor 23. A series arrangement of a further resistor 24 and a capacitor 25 is connected between the collector of the transistor 22 and earth. An output line leads from the capacitor 25 through an inverter 26 to the one input of the AND gate 13 (FIG. 1). The resistor 23 has a relative high resistance of 47,000 ohms, for example. The resistor 24 has a much lower resistance of 330 ohms, for example. In a practical embodiment, the capacitor 25 had a capacitance of 2.2 microfarads. Therefore, with non-conducting transistor 22, the time constant of the RC-circuit including resistors 23, 24 and capacitor 25 is substantially larger than that of the RC-circuit including resistor 24, capacitor 25 and conducting collector-emitter path of transistor 22.

In the absence of any signal S2, transistor 22 is non-conducting, and capacitor 25 is charged, therefore, to the level of the positive supply voltage.

With a signal S2 having a positive amplitude of less than the potential difference between inputs E1 and E2 of the operational amplifier 15, there is no positive signal at its output A, the transistor 22 remaining in its non-conducting state. In that manner noise signal background on the telephone line is effectively suppressed.

When the signal S2 exceeds the potential difference between the inputs E1 and E2 in a positive direction, a positive output signal drives the transistor 22 in its conducting state, the capacitor 25 discharging through the smaller resistor 24 and the transistor 22. However, if the input signal S2 is of extremely short duration as is the case with a noise peak, the capacitor 25 will not discharge to an appreciable extent before the transistor 22 assumes again its non-conducting state. In that way, short noise peaks have no effect. Only if the signal S2 has a time duration beyond a predetermined value allowing the capacitor 25 to discharge, a negative signal will appear at the input of the inverter 26, and give rise to a positive signal S5 at its output and, consequently, at the one input of the AND gate 13.

As the signal S2 falls below the threshold determined by the potential difference between the inputs E1 and E2 of the operational amplifier 15, the transistor 22 assumes again its non-conducting state. However, the capacitor 25 charges very slowly through the larger resistor 23, and thus maintains a low potential at the capacitor 25 for a longer time. Therefore, the positive signal S5 at the output of the inverter 26 remains practically constant for a time determined by the time constant of the resistor 23 and the capacitor 25. Thereafter, when the capacitor has again a substantial positive charge, the inverter 26 charges the binary value of its output signal S5.

In summary, the circuit of FIG. 2, despite its little number of circuit components, favourable performs the function of the threshold switch 5, the rectifier 6 and the delay switch 7 described in connection with FIG. 1. It generates an output signal S5 only, if the input signal S2 has a minimum amplitude and a minimum duration, and it further "stretches" the detected signal to have a minimum duration after detection.

I claim:

1. An electronic voice detector for use in an automatic telephone answering apparatus, said voice detector having input means for receiving audio signals from a telephone line, and output means for supplying a control signal indicating the presence of an incoming voice signal, wherein between said input means and said output means a first signal channel and a second signal channel are disposed in parallel configuration, said signal channels being commonly connected to said input means and said signal channels being connected to said output means through a logic means, said first signal channel comprising signal threshold means for generating an output signal if the signal from the input means has an amplitude exceeding a predetermined level, and signal delay means connected to the output of said threshold means for generating an output signal if said output signal from said threshold means has a duration exceeding a predetermined time interval, said second signal channel comprising period measuring means for measuring the period of each cycle of the signal from said input means and for generating a first output signal at a first output if the period of the cycle is within a predetermined range, and a second output signal at a second output if the period of the cycle is outside said predetermined range, and counting means having a counting input, a reset input and an output, said counting and reset inputs being connected to said first and second outputs, respectively, of said period measuring means, said counting means generating an output signal for a predetermined number of consecutive output signals from said first output of said period measuring means, and being reset by an output signal from said second output of said period measuring means, said output of said delay means being connected to a first input of said logic means and said output of said counting means being connected to a second input of said logic means, said logic means being adapted to supply the control signal to said output means with the presence of an output signal from said delay means and with the simultaneous absence of an output signal from said counting means.

2. The voice detector of claim 1, wherein said input means include a bandpass filter common to the first and the second signal channels.

3. The voice detector of claim 2, wherein the bandpass filter has a pass band approximately extending from 300 Hz to 3600 Hz.

4. The voice detector of claim 1, wherein a signal rectifying means is disposed between said threshold means and said delay means in said first signal channel.

5. The voice detector of claim 1, wherein said delay means in said first signal channel comprises means for responding to input signals having a duration of at least approximately 3 milliseconds to produce a digital output signal having a duration of at least approximately 0.5 seconds.

6. The voice detector of claim 1, wherein between said input means and said period measuring means in said second signal channel a symmetrical limiter is connected.

7. The voice detector of claim 1, wherein said counting means includes a comparator for continuously comparing the count in said counting means with a predetermined value and for supplying an output signal when the count reaches said predetermined value.

8. The voice detector of claim 1, wherein said logic means includes an AND gate having two inputs, a first input of said AND gate being connected to the output of said delay means and a second input of said AND gate being connected, through an inverter, to the output of said counting means.

9. The voice detector of claim 8, wherein a signal rectifying means is disposed between said threshold means and said delay means in said first channel, and wherein said threshold means, said rectifying means and said delay means in combination include an operational amplifier having a reference input, a signal input and an output, for holding each of said inputs at a different fixed potential, a transistor switch operable by the signal from the output of said operational amplifier, a first time delay circuit including in series said transistor switch, a first resistor and a capacitor, a second time delay circuit including in series a second resistor arranged as a load resistor of said transistor switch, said first resistor and said capacitor, said second resistor having a substantially higher resistance value than said first resistor, whereby with said transistor switch being conducting said capacitor is discharged through said first resistor and said tansistor switch at a fast rate, and with said transistor switch being non-conducting said capacitor is charged through said second and first resistors at a slow rate, said first input of said AND gate being connected to said capacitor.

10. The voice detector of claim 9, wherein a second inverter is disposed between said capacitor and said first input of said AND gate.

* * * * *